No. 865,815. PATENTED SEPT. 10, 1907.
W. H. POWELL.
SYSTEM OF MOTOR CONTROL.
APPLICATION FILED SEPT. 29, 1906.

Witnesses
Inventor
William H. Powell
Attorney

UNITED STATES PATENT OFFICE.

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF MOTOR CONTROL.

No. 865,815.　　　　　Specification of Letters Patent.　　　Patented Sept. 10, 1907.

Application filed September 29, 1906. Serial No. 336,694.

*To all whom it may concern:*

Be it known that I, WILLIAM H. POWELL, a citizen of the United States, residing at Norwood, in the county of Hamilton and State of Ohio, have invented certain new and useful Improvements in Systems of Motor Control, of which the following is a full, clear, and exact specification.

My invention relates to motor control systems and especially to control systems for motors requiring great variation of speed in minimum time.

One of the objects of my invention is to enable the speed of a motor to be rapidly varied with minimum loss of energy.

Other objects will appear hereinafter.

In one aspect my invention comprises the method of regulating the speed of an electric motor, which consists in supplying the armature of said motor from one source of current, supplying its field jointly from said source of current and another source of current, and varying the electromotive forces of said two sources of current.

In another aspect my invention comprises a system of motor control, consisting of a motor, a source of current supplying the armature of said motor, a second source of current which in series with the first source supplies the field winding of the motor, and means for varying the electromotive forces of said two sources of current.

In a more specific aspect my invention comprises a system of motor control consisting of a main generator, a motor whose armature is supplied thereby, an auxiliary generator which in series with the main generator energizes the field windings of the main generator, the auxiliary generator, and the motor, and variable resistances in circuit with said field windings.

Other features of my invention will appear from the following description and accompanying drawings and will be particularly pointed out in the claims.

Figure 1:
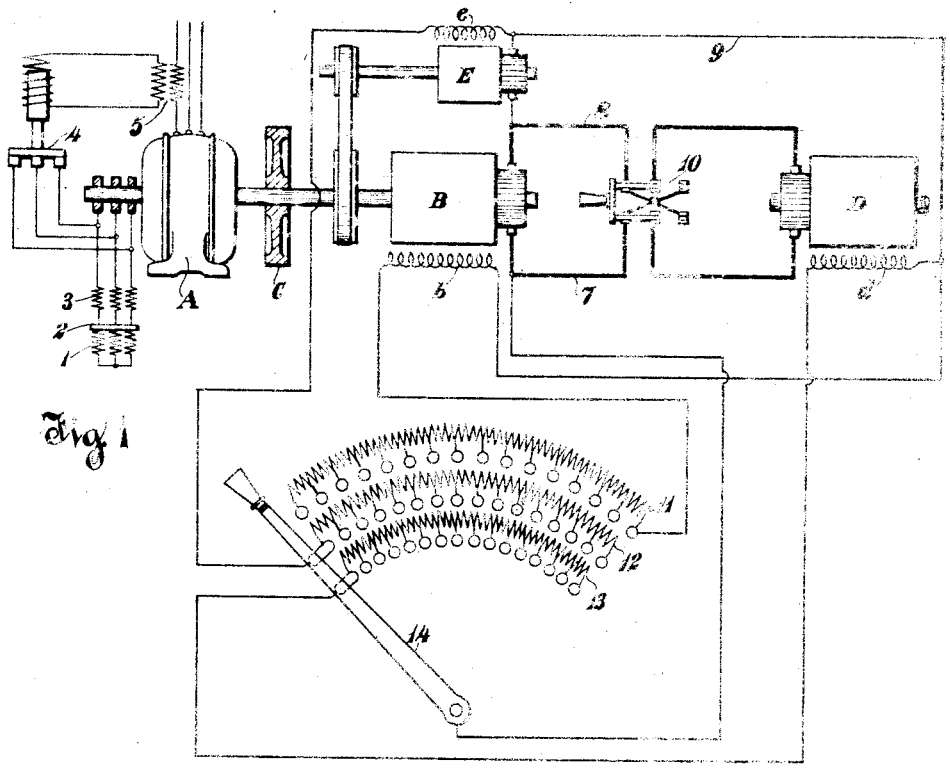
Figure 2:
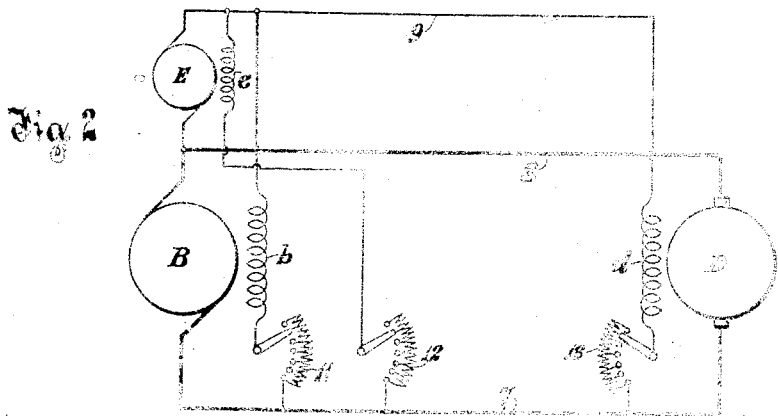

Figure 1 is a diagram illustrating my invention; and Fig. 2 is a simpler diagram showing more clearly the system of connections.

In Fig. 1, A is an electric motor of the three-phase induction type, though obviously other forms of the motors could be used instead. In the rotor circuit of this motor is a starting resistance 1 adjustable by means of a short-circuiting bar 2, and a regulating resistance 3 arranged to be cut in and out by a solenoid switch 4, which in turn is responsive to the current strength of the primary circuit of the motor, as through a series transformer 5.

Two generator armatures B and E are driven by the motor A, being either directly connected thereto, as is armature B, or belted thereto, as is armature E. Either or both armatures may be driven by the motor A in either manner, or, if desired, in any other manner. On the common shaft of the motor A and the generator B is a heavy fly-wheel C.

The armature D of the working motor is supplied with current by the generator armature B through the mains 7 and 8, in which, if desired, a reversing switch 10 may be placed. A third main 9 leads from the exciter E to the motor D, the exciter armature being so connected between the mains 8 and 9 that the voltage between the mains 7 and 9 is the sum of the voltages of the generators B and E. The generator field winding *b*, the motor field winding *d*, and the exciter field winding *e* are each connected across the mains 7 and 9, as most clearly shown in Fig. 2. In the circuits of these field windings are variable resistances 11, 12, and 13. These resistances may be controlled by separate rheostat arms, as shown in Fig. 2, but are preferably controlled by a single arm or other movable member 14, as shown in Fig. 1. A movement of the arm 14 varies the resistances of the exciter and motor field circuits correspondingly, and the resistance of the generator field circuit inversely to the other two. The arm 14 when in its extreme left position cuts out the entire resistances 12 and 13 and preferably opens the main generator field circuit.

The operation of the system is as follows:—The primary circuit of motor A is closed and the motor accelerated by cutting out the starting resistance 1 by the bar 2. The switch 4 is held open by its solenoid at this time because of the heavy current required for starting the motor. If desired, other means may be used to insure the open condition of this switch during starting. After all the starting resistance has been cut out and the motor has gained sufficient speed, the solenoid switch 4 is allowed to close to cut out resistance 3, because of the decrease in the primary current of motor A. The fly-wheel C and the generator armatures B and E are also started with the motor A, and the fly-wheel stores mechanical energy by its rotation. During this starting the arm 14 is preferably in its "off" or extreme left position. The motor field *d* and the exciter field *e* are now excited solely by the exciter E, as the generator armature B is inactive because its field circuit is open. The reversing switch 10 being now closed to give the desired direction of rotation to the motor D, a movement of the arm 14 to the right first completes the generator field circuit through the entire resistance 11, and then gradually diminishes said resistance 11 while increasing the resistances 12 and 13. This movement of the arm 14, by varying their field strengths, causes a decrease in the exciter voltage and an increase in the main generator voltage.

Although the inverse varying of the voltages of the exciter and the main generator may either increase, decrease or maintain constant the voltage between the mains 7 and 9, in the case here described it is assumed that the generator voltage rises faster than the exciter voltage falls, thus simultaneously increasing the voltage both between the mains 7 and 8, and the mains 7 and 9. This increase of voltage between the mains 7 and 9 tends to increase the strength of the field coil $d$ of the working-motor considerably, and it is to get the desired effect on the field coil of the working motor that the resistance 13 is used. The resistance 13 may be so proportioned as to maintain constant the strength of the field coil $d$ or to increase or decrease it. It is now deemed preferable by me to increase slightly the strength of this coil as the current in the armature of the motor is increased, so that better commutation may be obtained.

If the load is heavy the working motor requires more power than the motor A can furnish, and the current rising in the primary of transformer 5 by reason of this heavy load, the switch is opened, thus inserting resistance 3 in the rotor circuit of motor A. The slip of motor A is therefore increased and the motor is permitted to slow down slightly, thus allowing the fly-wheel C to give up some of the mechanical energy it has stored, which energy helps the motor to drive the generators B and E to supply electrical energy at the rate demanded by the motor D to drive its load. The speed which the motor D acquires depends upon the extent of movement of the arm 14, the full speed being reached when the arm 14 is in its extreme right position, when the whole resistance 11 has been cut out of the generator field circuit B, and the entire resistances 12 and 13 into the exciter and motor field circuits respectively. As the arm 14 is moved backwards toward the left, the reverse of the above action takes place; i. e. the voltage of B is decreased and the voltage of E increased to diminish the voltage applied to the armature D and, in the case here specifically described, the strength of motor field coil $d$, thus slowing down the motor D by causing it to act as a generator to supply current to the armature B, which now serves as a motor to help restore energy to the fly-wheel C. There is a powerful braking effect on the working motor due to its acting as a generator. The diminished current in the primary of transformer 5 also causes the solenoid switch 4 to close, if it has not already closed, thereby increasing the speed of motor A so that it may also suply energy to the fly-wheel C.

In this description and in the claims I use the terms "inversely" and "correspondingly" in their broad sense, and do not wish to limit myself to exact inverse or direct proportion.

I have described my invention in what I now consider to be its preferred form, but many details in the precise arrangement shown and described may be varied without departing from the spirit and scope of my invention. All such obvious modifications I aim to cover in the claims.

What I claim as new is:—

1. The method of regulating the speed of an electric motor which consists in supplying the armature of said motor from one source of current, supplying its field jointly from said source of current and another source of current in series, and varying the electromotive forces of said two sources of current.

2. The method of regulating the speed of an electric motor which consists in energizing the armature of said motor from one source of current, energizing its field jointly from said source of current and another source of current in series, and varying the electromotive forces of said two sources of current inversely.

3. The method of regulating the speed of an electric motor which consists in energizing the armature of said motor from one source of current, energizing its field jointly from said source of current and another source of current, and varying the electromotive forces of said two sources of current.

4. The method of regulating the speed of an electric motor which consists in supplying the armature of said motor from one source of current, supplying its field jointly from said source of current and another source of current, and varying the electromotive forces of said two sources of current inversely.

5. The method of regulating the speed of an electric motor which consists in supplying the armature of said motor from one source of current, supplying its field jointly from said source of current and another source of current in series, and varying the electromotive force of said first source of current.

6. The method of regulating the speed of an electric motor which consists in energizing the armature of said motor from one source of current, energizing its field jointly from said source of current and another source of current, and varying the electromotive force of said first source of current.

7. A system of motor control, comprising a motor, a source of current supplying the armature of said motor, a second source of current which jointly with the first source supplies the motor field coil, and means for varying the electromotive force of said first source of current to vary the speed of the motor.

8. A system of motor control, comprising a motor, a source of current supplying the armature of said motor, a second source of current which jointly with the first source supplies the motor field coil, and means for varying the electromotive forces of said two sources of current.

9. A system of motor control, comprising a motor, a source of current supplying the armature of said motor, a second source of current which jointly with the first source supplies the motor field coil, and means for varying the electromotive forces of said two sources of current inversely.

10. A system of motor control, comprising a motor, a source of current supplying the armature of said motor, a second source of current which jointly with the first source supplies the motor field coil, and a controller for varying the electromotive forces of both sources of current by a single movement.

11. A system of motor control, comprising a motor, a source of current supplying the armature of said motor, a second source of current which jointly with the first source supplies the motor field coil, and a controller so connected and arranged that within its limit of movement it can inversely vary the electromotive forces of the two sources of current.

12. In combination, a generator, a motor supplied thereby, and an exciter, the field windings of the generator and the motor being energized by the generator and the exciter jointly.

13. In combination, a generator, a motor supplied thereby, and an exciter, the field coils of the generator and the exciter being supplied by the generator and the exciter jointly.

14. In combination, a generator, a motor supplied thereby, and an exciter, the field coils of the motor and the exciter being energized by the generator and the exciter jointly.

15. In combination, a generator, a motor supplied thereby, and an exciter, the field coils of the generator, the motor and the exciter all being supplied by the generator and the exciter jointly.

16. A system of motor control, comprising a main generator, a motor supplied thereby, and an auxiliary generator, the field windings of the main generator and the motor being energized by the two generators jointly, and a controller arranged to vary the resistance of the field circuit of said main generator to vary the speed of the motor.

17. A system of motor control, comprising a motor, a generator supplying the armature of the motor, a second generator assisting the first to supply the field winding of the motor, and means for varying the field strength of the first generator to vary the motor speed.

18. A system of motor control, comprising a motor, a generator supplying the armature of the motor, a second generator assisting the first to supply the field winding of the motor, and means for varying the field strength of the second generator to vary the motor speed.

19. A system of motor control comprising a motor, a generator supplying the armature of the motor, a second generator assisting the first to supply the field winding of the motor, and means for varying the field strengths of the two generators to vary the motor speed.

20. A system of motor control, comprising a motor, a generator supplying the armature of the motor, a second generator assisting the first to supply the field winding of the motor, and means for inversely varying the field strengths of the two generators.

21. A system of motor control, comprising a motor, a generator supplying the armature of the motor, a second generator assisting the first to supply the field winding of the motor, and a unitary means for varying the field strengths of the two generators.

22. A system of motor control, comprising a motor, a generator supplying the armature of the motor, a second generator assisting the first to supply the field winding of the motor, and a unitary means for inversely varying the field strengths of the two generators.

23. A system of motor control, comprising a generator, a motor the armature of which is exclusively supplied by said generator, a second generator assisting the first to supply the field winding of the motor, and means for varying the field strengths of the first generator and the motor.

24. A system of motor control, comprising a generator, a motor the armature of which is exclusively supplied by said generator, a second generator assisting the first to supply the field winding of the motor, and means for varying the field strengths of the second generator and the motor.

25. A system of motor control, comprising a motor, a generator supplying the armature of the motor, a second generator assisting the first to supply the field winding of the motor, and a unitary means for varying the field strengths of the first generator and the motor.

26. A system of motor control, comprising a motor, a generator supplying the armature of the motor, a second generator assisting the first to supply the field winding of the motor, and a unitary means for varying the field strengths of the second generator and the motor.

27. A system of motor control, comprising a generator, a motor the armature of which is exclusively supplied by said generator, a second generator assisting the first to supply the field winding of the motor, and means for varying the field strengths of the two generators and the motor.

28. A system of motor control, comprising a motor, a generator supplying the armature of the motor, a second generator assisting the first to supply the field winding of the motor, and means for inversely varying the field strengths of the two generators and also varying the field strength of the motor.

29. A system of motor control, comprising a main generator, a motor supplied thereby, an auxiliary generator, the field windings of the main generator and the motor being energized by the two generators jointly, and a single controller arranged to vary the resistances of the field circuits of said main generator and said motor.

30. A system of motor control, comprising a main generator, a motor supplied thereby, an auxiliary generator, the field windings of both generators and the motor being energized by the two generators jointly, and a single controller arranged to vary inversely the resistances of the field circuits of said main generator and said motor.

31. A system of motor control, comprising a main generator, a motor supplied thereby, an auxiliary generator, the field windings of both generators and the motor being energized by the two generators jointly, and a single controller arranged to vary the resistances of the field circuits of said main generator and said auxiliary generator.

32. A system of motor control, comprising a main generator, a motor supplied thereby, an auxiliary generator, the field windings of both generators and the motor being energized by the two generators jointly, and a single controller arranged to vary inversely the resistances of the field circuits of said generator and said auxiliary generator.

33. A system of motor control, comprising a main generator, a motor supplied thereby, an auxiliary generator, the field windings of the auxiliary generator and the motor being energized by the two generators jointly, and a single controller arranged to vary the resistances of the field circuits of said motor and said auxiliary generator.

34. A system of motor control, comprising a main generator, a motor supplied thereby, an auxiliary generator, the field windings of both generators and the motor being energized by the two generators jointly, and a single controller arranged to vary correspondingly the resistances of the field circuits of said motor and said auxiliary generator.

35. A system of motor control, comprising a main generator, a motor supplied thereby, an auxiliary generator, the field windings of both generators and the motor being energized by the two generators jointly, and a single controller arranged to vary the resistances of the field circuits of said generator, said motor and said auxiliary generator.

36. A system of motor control, comprising a main generator, a motor supplied thereby, an auxiliary generator, the field windings of both generators and the motor being energized by the two generators jointly, and a single controller arranged to vary the resistances of the field circuits of said motor and said auxiliary generator correspondingly and the resistance of the field circuit of said generator inversely thereto.

37. A system of motor control, comprising three leads, a main generator and a motor, the armatures of which are permanently connected separately between the first and second leads, an auxiliary generator, the armature of which is connected between the second and third leads, the motor field winding being connected between the first and third leads, and means for varying the electromotive force of the main generator to vary the speed of the motor.

38. A system of motor control, comprising three leads, a main generator and a motor, the armatures of which are connected separately between the first and second leads, an auxiliary generator, the armature of which is connected between the second and third leads, the motor field winding being connected between the first and third leads, and means for varying the electromotive force of the auxiliary generator to vary the speed of the motor.

39. A system of motor control, comprising three leads, a motor and a main generator, the armatures of which are each permanently connected between the first and second leads, an auxiliary generator, the armature of which is connected between the second and third leads, the motor field winding being connected between the first and third leads, and means for varying the electromotive forces of the main generator and the auxiliary generator.

40. A system of motor control, comprising three leads, a motor and a main generator, the armatures of which are connected separately across the first and second leads, an auxiliary generator, the armature of which is connected across the second and third leads, the motor field winding being connected across the first and third leads, and means for varying the electromotive forces of the main generator and the auxiliary generator inversely.

41. A system of motor control, comprising three leads, a main generator and a motor, the armatures of which are each connected across the first and second leads, an auxiliary generator, the armature of which is connected across the second and third leads, the field windings of said generator and said motor being connected across the first and third leads, and means for varying the electromotive forces of said main and auxiliary generators.

42. A system of motor control, comprising three leads, a main generator and a motor, the armatures of which are each connected separately between the first and second leads, an auxiliary generator the armature of which is connected between the second and third leads, the field windings of said generator and said motor being connected between the first and third leads, and means for varying the electromotive forces of said main and auxiliary generators inversely.

43. A system of motor control, comprising three leads, a main generator and a motor, the armatures of which are connected separately between the first and second leads, an auxiliary generator the armature of which is connected between the second and third leads, the field windings of the motor and the exciter being connected between the first and third leads, and means for varying the electromotive forces of said generator armatures.

44. A system of motor control, comprising three leads, a main generator and a motor, the armatures of which are each connected across the first and second leads, an auxiliary generator, the armature of which is connected across the second and third leads, the field windings of the motor and the exciter being connected across the first and third leads, and means for varying inversely the electromotive forces of said generator armatures.

45. A system of motor control, comprising three leads, a main generator and a motor, the armatures of which are connected separately across the first and second leads, an auxiliary generator, the armature of which is connected across the second and third leads, the field windings of the motor and both generators being connected across the first and third leads, and means for varying the electromotive forces of said generators.

46. A system of motor control, comprising three leads, a main generator and a motor, the armatures of which are each connected between the first and second leads, an auxiliary generator, the armature of which is connected between the second and third leads, the field windings of the motor and both generators being connected between the first and third leads, and means for varying the electromotive forces of said generators inversely.

47. A system of motor control, comprising three leads, a main generator and a motor, the armatures of which are each connected between the first and second leads, an auxiliary generator, the armature of which is connected between the second and third leads, the field windings of some or all of said machines being connected between the first and third leads, and means for varying the electromotive force of the auxiliary generator to vary the speed of the motor.

48. A system of motor control, comprising three leads, a main generator and a motor, the armatures of which are each connected between the first and second leads, an auxiliary generator, the armature of which is connected between the second and third leads, the field windings of some or all of said machines being connected between the first and third leads, and means for varying the electromotive force of the main generator to vary the speed of the motor.

49. A system of motor control, comprising three leads, a main generator and a motor, the armatures of which are connected between the first and second leads, an auxiliary generator, the armature of which is connected between the second and third leads, the field windings of some or all of said machines being connected between the first and third leads, and means for varying the electromotive forces of the two generators to vary the speed of the motor.

50. A system of motor control, comprising three leads, a main generator and a motor, the armatures of which are each connected between the first and second leads, an auxiliary generator, the armature of which is connected between the second and third leads, the field windings of some or all of said machines being connected between the first and third leads, and means for inversely varying the electromotive forces of the two generators to vary the speed of the motor.

51. A system of motor control, comprising two generators and a motor, connections whereby the motor armature has impressed thereon the voltage of but one of said generators, and the motor field circuit the sum of the voltages of the two generators, and means for varying the electromotive force of one of the generators to vary the speed of the motor.

52. A system of motor control, comprising two generators and a motor, connections whereby the motor armature has always impressed thereon the voltage of but one of said generators, and the motor field circuit the sum of the voltages of the two generators, and means for varying the electromotive forces of the two generators.

53. A system of motor control, comprising two generators and a motor, connections whereby the motor armature has impressed thereon the voltage of but one of said generators and the motor field winding the sum of the voltages of the two generators, and means for varying the electromotive forces of the two generators inversely.

54. A system of motor control, comprising two generators and a motor, connections whereby the motor armature has impressed thereon the voltage of one of said generators and the field windings of all of said machines, the sum of the voltages of the two generators, and means for varying the electromotive forces of said two generators.

55. A system of motor control, comprising two generators and a motor, connections whereby the motor armature has impressed thereon the voltage of one of said generators and the field windings of all of said machines the sum of the voltages of the two generators, and means for varying the electromotive forces of said two generators inversely.

56. A system of motor control, comprising two generators and a motor, connections whereby the motor armature has always impressed thereon the voltage of one of said generators only and the field circuits of some or all of said machines the sum of the voltages of the two generators, and variable resistances in the field circuits of said generators.

57. A system of motor control, comprising two generators and a motor, connections whereby the motor armature has impressed thereon the voltage of one of said generators and the field windings of some or all of said machines the sum of the voltages of the two generators, and inversely variable resistances in the field circuits of said two generators respectively.

58. A system of motor control, comprising two generators and a motor, connections whereby the motor armature has impressed thereon the voltage of one of said generators and the field windings of some or all of said machines the sum of the voltages of the two generators, and variable resistances in the field circuits of said three machines respectively.

59. A system of motor control, comprising two generators and a motor, connections whereby the motor armature has impressed thereon the voltage of one of said generators and the field circuits of some or all of said machines the sum of the voltages of the two generators, variable resistances in the field circuits of said three machines respectively, and a single means for varying all of said resistances.

60. A system of motor control, comprising two generators and a motor, connections whereby the motor armature has always impressed thereon the voltage of one of said generators only and the field circuits of some or all of said machines the sum of the voltages of the two generators, and variable resistances in the field circuits of said motor and one of said generators.

61. A system of motor control, comprising two generators and a motor, connections whereby the motor armature has impressed thereon the voltage of one of said generators and the field windings of some or all of said machines the sum of the voltages of the two generators, and inversely variable resistances in the field circuits of said motor and one of said generators.

62. A system of motor control, comprising two generators and a motor, connections whereby the motor armature has always impressed thereon the voltage of one of said generators only and the field windings of some or all of said machines the sum of the voltages of the two generators, and correspondingly variable resistances in the field circuits of said motor and one of said generators.

63. In combination, a source of power, two generators driven thereby, and a motor whose armature is supplied by one of said generators and whose field is supplied by the two generators jointly; means for varying the electromotive forces of the two generators, a fly-wheel mechanically connected to the generators, and means for allowing said fly-wheel to give up its energy when the motor load rises above normal.

64. A system of motor control, comprising a motor, a generator supplying the armature of said motor, a second generator assisting the first to supply the field winding of said motor, a fly-wheel mechanically connected to said generators, and means for inversely varying the field strengths of said two generators.

65. A system of motor control, comprising an induction motor, two generators driven thereby, a fly-wheel on the shaft of the induction motor, and a working motor whose armature is supplied by one of said generators and whose field is supplied by the two generators jointly.

66. A system of motor control, comprising an induction motor, two generators driven thereby, a fly-wheel on the shaft of the induction motor, a working motor whose armature is supplied by one of said generators and whose field is supplied by the two generators jointly, and means for varying the field strengths of the working motor and one of said generators.

67. A system of motor control, comprising an induction motor, two generators driven thereby, a fly-wheel on the shaft of the induction motor, a working motor whose armature is supplied by one of said generators and whose field is supplied by the two generators jointly, and means for inversely varying the field strengths of the working motor and one of said generators.

68. A system of motor control, comprising an induction motor, two generators driven thereby, a fly-wheel on the shaft of the induction motor, a working motor whose armature is supplied by one of said generators and whose field is supplied by the two generators jointly, and means for correspondingly varying the field strengths of the working motor and one of said generators.

69. A system of motor control, comprising an induction motor, two generators driven thereby, a fly-wheel on the shaft of the induction motor, a working motor whose armature is supplied by one of said generators and whose field is supplied by the two generators jointly, and means for varying the field strengths of said two generators.

70. A system of motor control, comprising an induction motor, two generators driven thereby, a fly-wheel on the shaft of the induction motor, a working motor whose armature is supplied by one of said generators and whose field is supplied by the two generators jointly, and means for inversely varying the field strengths of said two generators.

71. A system of motor control, comprising an induction motor, two generators driven thereby, a fly-wheel on the shaft of the induction motor, a working motor whose armature is supplied by one of said generators and whose field is supplied by the two generators jointly, and means for varying the field strengths of the two generators and the working motor.

72. A system of motor control, comprising an induction motor, two generators driven thereby, a fly-wheel on the shaft of the induction motor, a working motor whose armature is supplied by one of said generators and whose field is supplied by the two generators jointly, and means for inversely varying the field strengths of the two generators and also varying the field strength of the working motor.

In testimony whereof I affix my signature, in the presence of two witnesses.

WILLIAM H. POWELL.

Witnesses:
GEO. B. SCHLEY,
FRED J. KINSEY.